United States Patent [19]

Burns et al.

[11] Patent Number: 4,848,320

[45] Date of Patent: Jul. 18, 1989

[54] SOLAR OVEN

[75] Inventors: Thomas J. Burns; Cynthia L. Burns, both of Fox Point, Wis.

[73] Assignee: Burns-Milwaukee, Inc., Milwaukee, Wis.

[21] Appl. No.: 96,124

[22] Filed: Sep. 11, 1987

[51] Int. Cl.$^4$ ............................................. F24J 2/02
[52] U.S. Cl. .................................... 126/451; 126/438; 126/424; 126/450
[58] Field of Search ............... 126/450, 451, 452, 417, 126/438, 424; 350/613; 248/667, 378, 284, 291, 1 F, 1 G, 1 I

[56] References Cited

U.S. PATENT DOCUMENTS

| | | | |
|---|---|---|---|
| 3,025,851 | 3/1962 | Steinberg | 126/451 |
| 3,053,248 | 9/1962 | Daymon | 126/451 |
| 3,106,201 | 10/1963 | Steinberg | 126/451 |
| 3,301,171 | 1/1967 | Steinberg | 99/425 |
| 3,938,497 | 2/1976 | Andrassy | 126/270 |
| 4,077,391 | 3/1978 | Way, Jr. | 126/451 |
| 4,082,079 | 4/1978 | Rodgers | 126/270 |
| 4,125,109 | 11/1978 | Erwin | 126/451 |
| 4,203,427 | 5/1980 | Way, Jr. | 126/451 |
| 4,220,141 | 9/1980 | Way, Jr. | 126/451 |
| 4,257,404 | 3/1981 | Steinberg | 126/451 |
| 4,284,071 | 8/1981 | Steinberg | 126/451 |
| 4,292,957 | 10/1981 | Golder | 126/451 |
| 4,378,790 | 4/1983 | Erwin | 126/451 |
| 4,446,854 | 5/1984 | Clevett et al. | 126/451 |
| 4,531,505 | 7/1985 | Hait et al. | 126/9 R |
| 4,619,244 | 10/1986 | Marks | 126/451 |
| 4,696,285 | 9/1987 | Zwach | 126/451 |

FOREIGN PATENT DOCUMENTS 2449854 10/1980 France ........................ 126/451

*Primary Examiner*—Robert E. Garrett
*Assistant Examiner*—Carl D. Price
*Attorney, Agent, or Firm*—Michael, Best & Friedrich

[57] ABSTRACT

A solar oven includes an oven chamber having an open end and an interior cooking chamber. A collapsible reflector assembly, having a plurality of hinged reflective panels, can be folded to a collapsed position for storage or transport, or opened during use to reflect additional sunlight through the open end and into the interior cooking chamber. A transparent door mounted over the open end retains heat within the interior cooking chamber, and a portable frame assembly supports the oven chamber for pivotal movement around a horizontal pivot axis. A ratchet mechanism retains the oven chamber in selected positions around the pivot axis, and a free-swinging, self-leveling tray keeps foodstuffs or cooking utensils level within the interior cooking chamber as the oven chamber is positioned around the pivot axis so as to utilize best the available sunlight.

11 Claims, 3 Drawing Sheets

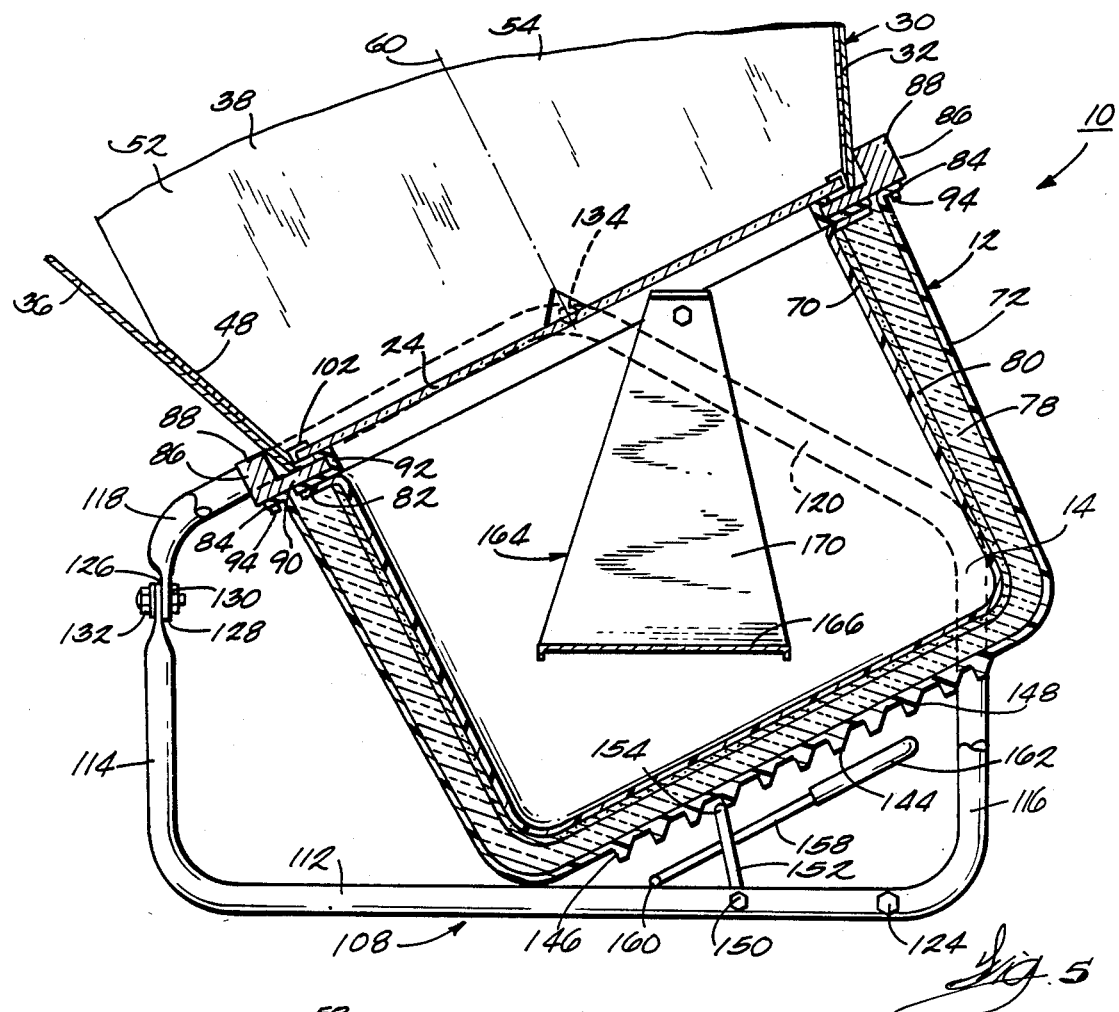
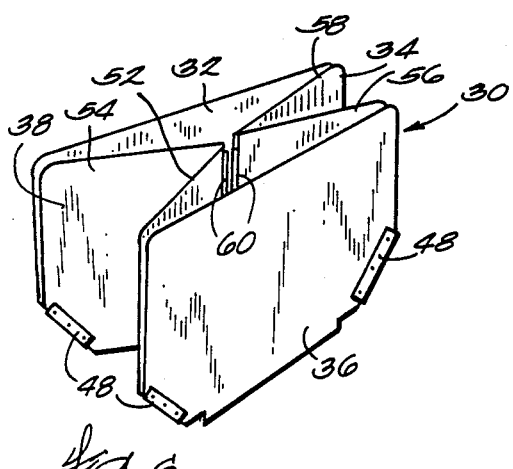
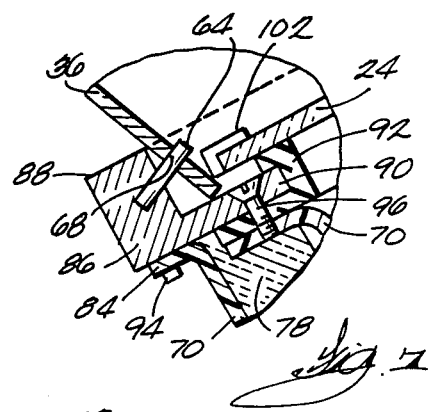
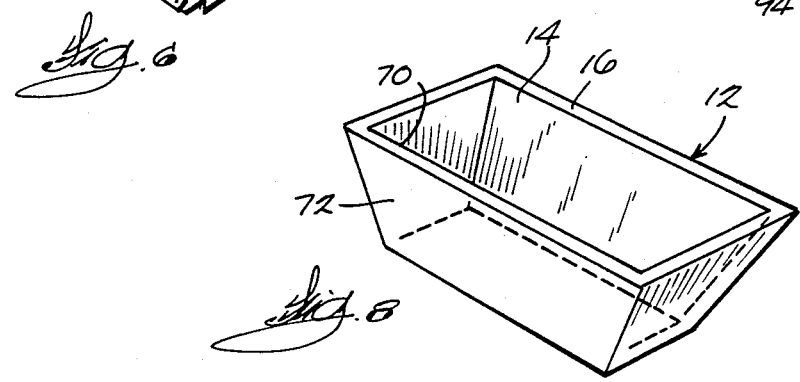

SOLAR OVEN

BACKGROUND OF THE INVENTION

This invention relates generally to solar ovens and particularly to portable solar ovens having detachable reflector assemblies.

Although solar ovens utilize a cost-free source of energy and thus offer the potential for significant energy cost savings, a variety of practical problems must be overcome before a particular oven design becomes practical for widespread use. Often, this task is complicated by directly competing concerns. For example, although some provision should be made to orient the oven relative to the sun so as to use best the available incident sunlight, it is desirable to avoid changing the orientation of foodstuffs within the oven during cooking as the oven is positioned to best catch the sun's rays. Similarly, although a compact, easily transportable structure is best suited for applications wherein oven portability is a factor, a solar oven must be of a certain minimum size if it is to play a meaningful role as a useful cooking utensil. Finally, although specific structure can be added to improve performance in various areas, a practical solar oven should be easy to set up and use, and the design and construction should lend itself to easy, thorough cleaning without requiring substantial or time consuming disassembly.

To help achieve widespread user-acceptance, a well designed solar oven should be capable of economical manufacture. Thus, any compromise reached among the various competing design criteria should result not only in acceptable overall oven performance, but economical and practical feasibility as well. Although a variety of solar oven constructions have from time to time been proposed, these prior constructions have typically sought to overcome specific deficiencies of still earlier designs, often at the significant expense of a competing design consideration.

In view of the foregoing, it is a general object of the present invention to provide a new and improved solar oven.

It is a more specific object of the present invention to provide a new and improved solar oven wherein the orientation of the oven relative to the sun can be adjusted without substantially changing the relative orientation of foodstuffs within the oven.

It is a still more specific object of the present invention to provide a new and improved solar oven wherein portability is provided in conjunction with a practical cooking capacity.

It is a still more specific object of the present invention to provide a new and improved solar oven which can be easily and quickly set up for use and taken down for cleaning, transport or storage.

SUMMARY OF THE INVENTION

The invention provides a solar oven including an oven chamber having an open end and defining an interior cooking chamber. Means within the interior cooking chamber are provided for absorbing sunlight and converting the absorbed sunlight into heat. An oven door is hingedly mounted over the open end of the oven chamber and is movable between open and closed positions relative to the open end. The solar oven further includes a plurality of substantially planar reflective panels and hinge means for pivotally joining adjacent ones of the reflective panels. The hinge means are operable to permit movement of the reflective panels from a collapsed position, wherein the reflective panels are substantially parallel to one another, and an open position, wherein the reflective panels form a loop-like structure dimensioned to extend substantially around the open end of the oven chamber. Mounting means are provided for detachably securing the reflective panels to the oven chamber around the open end when the reflective panels are in the open position.

The invention also provides a reflector assembly for reflecting sunlight into the interior of a solar oven through an opening in the oven. The reflector assembly includes a plurality of substantially planar reflective panels and hinge means for hingedly joining adjacent ones of the reflective panels so as to permit movement of the reflective panels from a collapsed position, wherein the reflective panels are substantially parallel to one another, and an open position, wherein the reflective panels form a loop-like structure dimensioned to extend substantially around the opening of the oven.

BRIEF DESCRIPTION OF THE DRAWINGS

The features of the present invention which are believed to be novel are set forth with particularity in the appended claims. The invention, together with the further objects and advantages thereof, can best be understood by reference to the following description taken in conjunction with the accompanying drawings, in the several figures of which like reference numerals identify like elements, and in which:

FIG. 5 is a cross-sectional view of the solar oven shown in FIG. 2 taken along line 5—5 thereof.

FIG. 6 is a perspective view of the reflector assembly showing the reflector assembly in a substantially collapsed position.

FIG. 7 is a fragmentary view, partially in section, of the solar oven showing structure for retaining the reflector assembly in position adjacent the open end of the oven.

FIG. 8 is a perspective view of an alternative embodiment oven chamber having a trapezoidal cross-section.

DESCRIPTION OF THE PREFERRED EMBODIMENT

Figure 1:
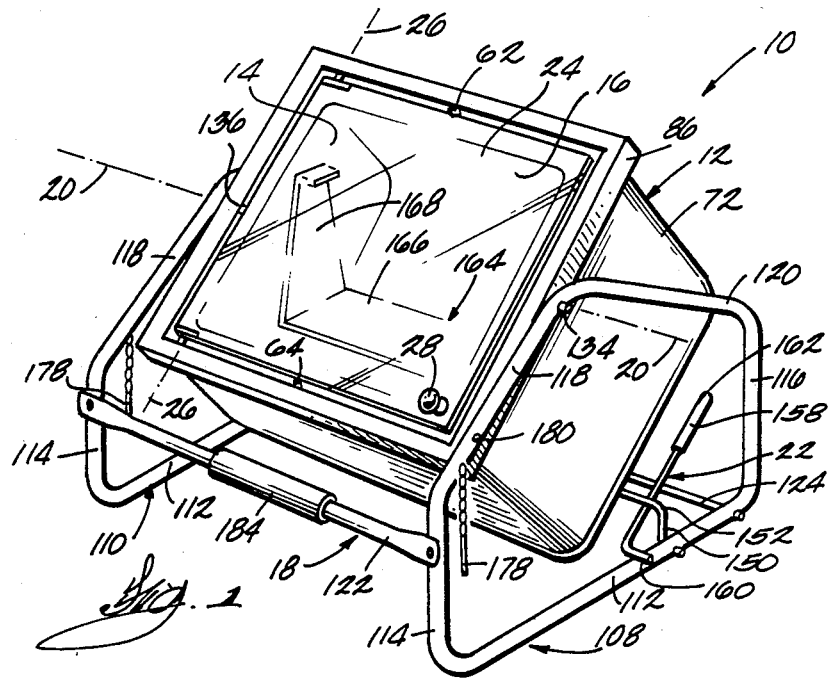
FIG. 1 is a perspective view of a solar oven embodying various of the features of the invention.
Figure 2:
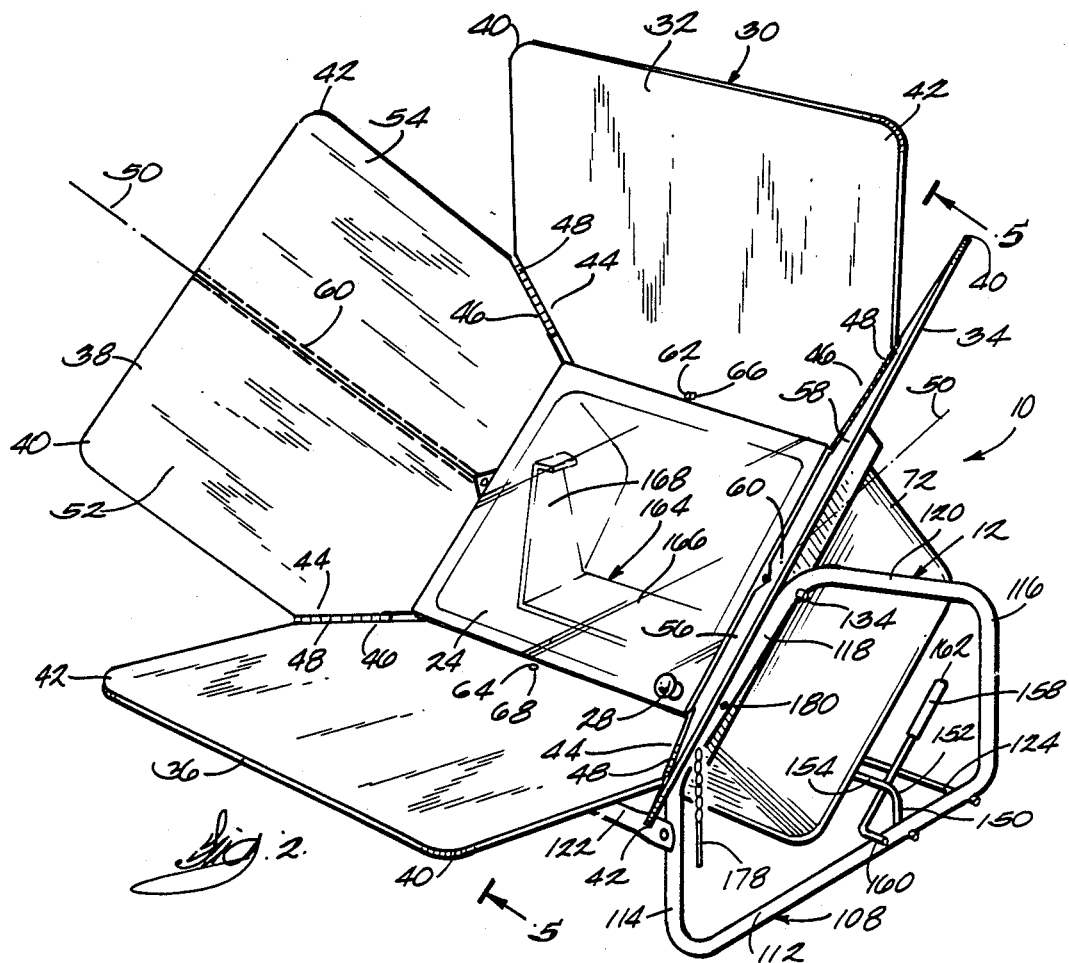
FIG. 2 is a perspective view of the solar oven illustrated in FIG. 1, further including a reflector assembly constructed in accordance with one aspect of the invention.

Referring to the drawings, and, in particular, to FIGS. 1 and 2, a solar oven 10 embodying various of the features of the invention is shown. As illustrated, the solar oven 10 generally comprises an oven chamber 12 defining an interior cooking chamber 14 and having an open end 16. A support assembly 18 is provided for pivotally supporting the oven chamber 12 around a substantially horizontal oven chamber pivot axis 20, and means, in the form of a user-actuable latch or ratchet mechanism 22, are provided for selectively retaining the oven chamber 12 in selected positions around the horizontal axis 20.

Access to the interior cooking chamber 14 is gained through an oven door 24 mounted over the open end 16 of the oven chamber 12 for movement, around a pivot axis 26, between open and closed positions relative to the open end 16. As illustrated, the pivot axis 26 extends generally along the left hand side of the oven chamber 12. A knob 28 for opening and closing the oven door 24 is provided adjacent the lower right hand corner of the door.

In use, the frame assembly 18 is positioned so that the open end 16 of the oven chamber 12 points generally toward the sun, and the rotational position or elevation of the oven chamber 12 around the horizontal pivot axis 20 is adjusted so that the plane of the oven door 24 is oriented substantially perpendicularly to the path of the sun's rays. To permit sunlight to enter the interior cooking chamber 14, the oven door 24 is made of a material, such as tempered glass, which is relatively transparent to sunlight and relatively opaque to heat. To convert sunlight into heat, the interior cooking chamber 14 preferably includes a flat-black coating which absorbs visible sunlight and converts the sunlight to heat. Because the oven door 24, when closed, retards the loss of heat through the open end 16 of the oven chamber 12, the temperature within the interior cooking chamber 14 rises to a level sufficient to cook foodstuffs placed therein.

To improve oven performance, the solar oven 10 includes a detachable reflector assembly 30 (FIG. 2) having a plurality of reflective panels arranged to intercept additional sunlight and reflect the additional sunlight through the oven door 24 and into the interior cooking chamber 14. In the embodiment illustrated, the reflector assembly 30 includes four planar reflective panels 32, 34, 36 and 38, each formed of polished aluminum or similar reflective material and each having the general shape of a rectangle wherein two upper corners 40 and 42 are rounded and two lower corners 44 and 46 are beveled. The reflective panels 32, 34, 36 and 38 are dimensioned so that each panel extends substantially along the entire length of one side of the oven chamber 12. In addition, the bevel angle of the lower corners 44 and 46 of the panels are such that, when the lower corners 44 and 46 of adjacent panels lie closely adjacent each other, each panel is oriented at an oblique angle relative to the oven door 24. The oblique angle is such that sunlight, reflected off each panel, is directed through the oven door 24 and into the interior cooking chamber 14.

In accordance with one aspect of the invention, the reflector assembly 30 is constructed so as to form a unitary collapsible structure which can be folded into a compact package for transport or storage and which can be easily and quickly unfolded for use. To this end, the adjacent beveled corners 44 and 46 of adjacent ones of the reflective panels 32, 34, 36 and 38 are hingedly joined to each other by means of individual hinges 48. In addition, two opposed ones of the reflective panels, such as the left and right hand side panels 38 and 34 in the illustrated embodiment, are each split along a line 50 extending through the center of each panel 38 or 34 so as to divide each of the panels 38 and 34 into a pair of substantially identical, substantially rectangular halves, 52 and 54, and 56 and 58. The adjacent halves 52 and 54, and 56 and 58, in turn, are joined by means of hinges 60 so that the two opposed, split, reflective panels 38 and 34 can fold inwardly toward each other as illustrated in FIG. 6. This permits the reflector assembly 30 to be easily and quickly folded between a collapsed position shown in FIG. 6, wherein the reflective panels 32, 34, 36 and 38 lie substantially parallel to one another, and an open position shown in FIG. 2 wherein the reflective panels form a loop-like structure dimensioned to extend substantially around the open end 16 of the oven chamber 12.

To further promote ease of assembly and disassembly, means are provided for detachably securing the reflector assembly 30 to the oven chamber 12 around the open end 16 when the reflector assembly 30 is in the open position. In the illustrated embodiment, such means include a pair of cylindrical pins 62 and 64 extending outwardly from the oven chamber 12 adjacent the upper and lower edges of the opening 16. In addition, a pair of holes 66 and 68 are formed adjacent the lower edges of the upper and lower reflective panels 32 and 36 and are positioned to receive the pins 62 and 64 when the reflector assembly 30 is positioned around the opening 16. By unfolding the reflector assembly 30 to the open position and thereafter positioning the reflector assembly 30 around the opening 16 so that the cylindrical pins 62 and 64 are received in their respective holes 66 and 68 in the reflective panels 32 and 36, the reflector assembly 30 can be easily and quickly mounted to the oven chamber 12.

The construction of the oven chamber 12 is best illustrated in FIGS. 5 and 7. As shown, the oven chamber 12 comprises a hollow housing of generally rectangular cross-section and includes an inner housing 70 formed of a durable metal, such as aluminum, and an outer housing 72 or cover formed of a durable non-metallic material such as ABS plastic. Preferably, the interior corners 74 and 76 of the inner housing 70 are rounded to facilitate easy cleaning. The flat-back coating on the interior of the inner housing 70 preferably comprises flat-black oven-baked polyester paint.

To help retain heat within the interior cooking chamber 14, a layer of insulating material, such as fiberglass insulation 78, is disposed within the space between the inner and outer housings 70 and 72. Preferably, the inner and outer housings 70 and 72 are dimensioned so that the thickness of the insulating layer 78 is approximately two inches. In addition, an approximately one-eighth inch thick ceramic paper liner 80 is positioned between the exterior of the interior housing 70 and the insulating layer 78.

As further illustrated in FIG. 5, both the inner and outer housings 70 and 72 include outwardly turned peripheral flanges, 82 and 84 respectively, which, in turn, are mounted to the undersurface of a generally rectangular bezel 86 defining the opening to the interior cooking chamber 14. Preferably, the bezel 86 is formed of compression molded fiberglass and resin and includes a relatively thicker rim portion 88 extending around a relatively thinner interior ledge portion 90. The bezel 86 is dimensioned so that the oven door 24 fits within the confines of the rim 88, and a silicon rubber gasket 92 is mounted over the interior ledge portion 90 of the bezel 86 to provide a cushioned seal against which the oven door 24 rests when the oven door is in the closed position.

As best illustrated in FIG. 7, the outer housing 72 is mounted to the bezel 86 by means of a plurality of screws 94 extending upwardly through the outwardly turned flange 84 of the outer housing 72, while the inner housing 70 is mounted to the bezel 86 by means of a plurality of screws 96 extending downwardly through the interior ledge portion 90 of the bezel 86 and into the outwardly turned flange 82 of the inner housing 70. Preferably, a portion of the rubber gasket 92 is sandwiched between the inner housing 70 and the bezel 86 to help retain the gasket 92 in position along the inner edge of the bezel 86.

Figure 3:
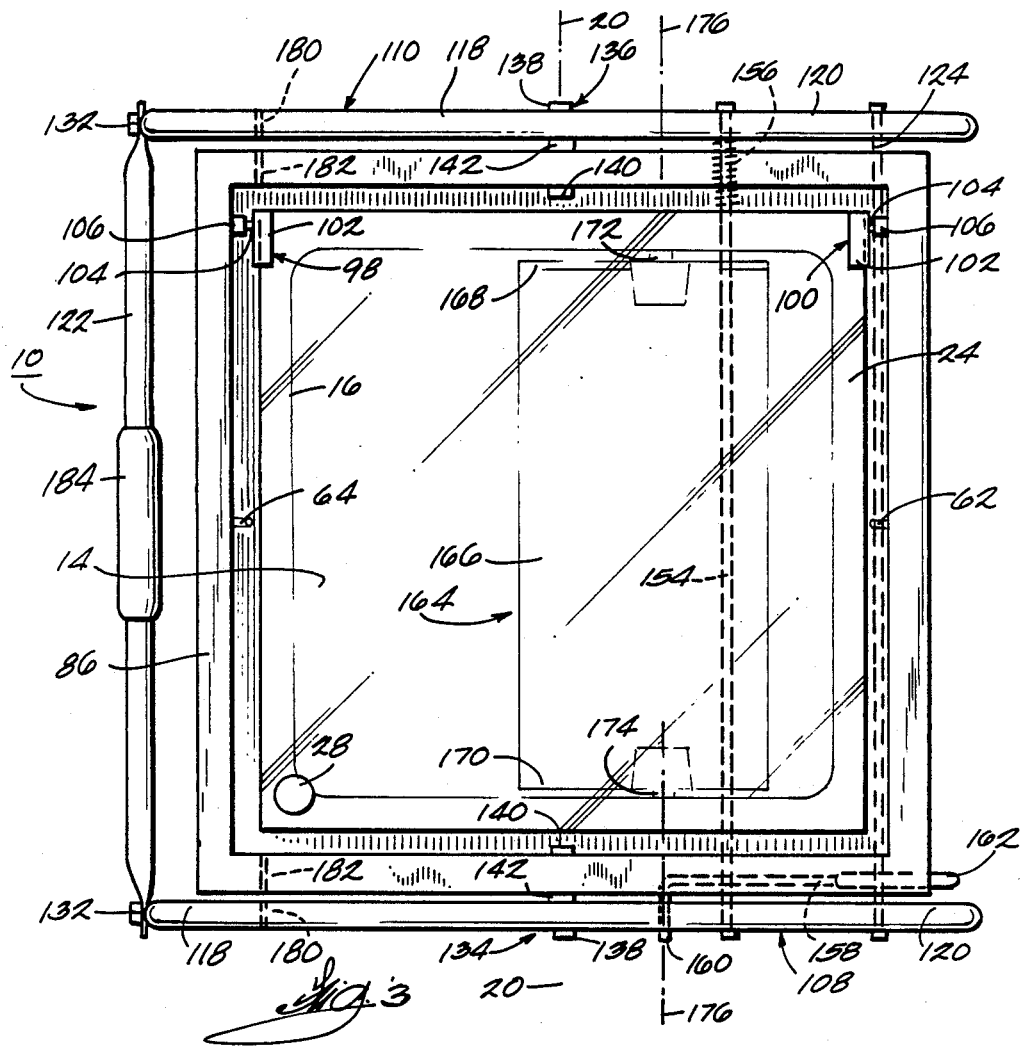
FIG. 3 is a top plan view of the solar oven illustrated in FIG. 1.

Referring to FIG. 3, the oven door 24 is hingedly mounted to the outer bezel 86 by means of a pair of hinge assemblies 98 and 100 adjacent two corners of the oven door 24. Each hinge assembly includes a metallic channel member 102 which is dimensioned to receive the edge of the oven door and which includes an outwardly projecting pin 104. Each hinge assembly further includes a metallic socket member 106 which is mounted to the outer rim 88 of the bezel 86 and is positioned to pivotally receive the projecting pin 104 of the adjacent channel member 102.

Figure 4:
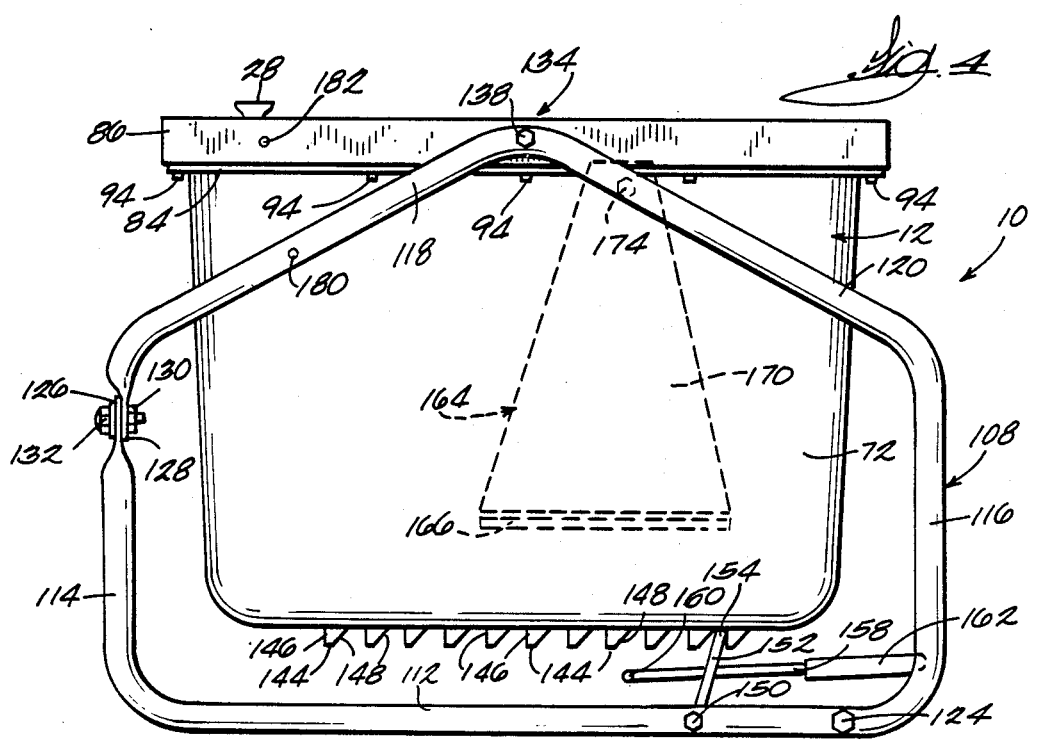
FIG. 4 is a side elevational view of the solar oven illustrated in FIG. 3.

The frame assembly 18 is preferably formed of tubular metallic elements such as aluminum pipe, and includes two substantially identical side pieces 108 and 110 each having the general form of a closed loop and each including a straight lower edge 112, a pair of forward and rearward vertical edges 114 and 116 and a pair of forward and rearward angled upper edges 118 and 120. A forward cross piece 122 is mounted between the forward vertical edges 114 of the two side pieces 108 and 110, and a rear cross piece 124 extends between the two side pieces 108 and 110 adjacent the corners formed by the rearward vertical edges 116 and the lower horizontal edges 112. As best seen in FIG. 4, the ends 126 and 128 of each side piece 108 and 110 overlap and are secured to each other by means of a nut 130 and bolt 132 extending through one end of the forward cross piece 122 and the two overlapped ends 126 and 128 of the adjacent frame side piece 108 or 110.

The oven chamber 12 is pivotally mounted between the side pieces 108 and 110 by means of a pair of individual pivot pins or axles 134 and 136 extending through the rim 88 of the bezel 86 and through the tubing of the side pieces 108 and 110 adjacent the juncture of the angled upper edges 118 and 120. Preferably, each of the pivot axles 134 and 136 comprises a metallic rod having a head portion 138 at one end and a threaded portion at the other end onto which a retaining nut 140 is threaded. In addition, a pair of nylon bushings 142, or similar elements, are preferably positioned between the side edges of the oven chamber 12 and the side pieces 108 and 110 of the frame assembly 18 to reduce friction and thereby permit the oven chamber 12 to pivot freely around the oven chamber pivot axis 20 defined by the pivot axles 134 and 136. Although the pivot axles 134 and 136 are preferably positioned adjacent the natural balance point of the oven chamber, in the preferred embodiment, the pivot axles 134 and 136 are positioned slightly forwardly of the natural balance point so that the oven chamber 12 has a natural tendency to rotate, under its own weight, in the clockwise direction as viewed in FIGS. 4 and 5.

As further illustrated in FIGS. 4 and 5, the undersurface of the outer oven chamber housing 72 is provided with a plurality of integrally formed ratchet teeth 144 extending generally parallel to oven chamber pivot axis 20 and arranged in a column extending front to back along the undersurface of the oven chamber 12. The forward face 146 of each tooth 144 is oriented substantially perpendicularly to the undersurface of the oven chamber 12 while the rearwardly disposed face 148 of each tooth 144 is angled as illustrated. A user-actuable pawl mechanism or assembly 150 is mounted between the frame side pieces 108 and 110 and is arranged to selectively engage individual ones of the teeth 144 to thereby retain the oven chamber 12 in the selected orientation around the pivot axis 20.

As illustrated, the pawl assembly 150 includes a transverse bar or pawl member 152 mounted for pivotal movement between the lower horizontal edges 112 of the frame side pieces 108 and 110 and includes an offset transverse portion 154 which can be rotated into or out of the path of the teeth 144 as the oven chamber 12 rotates around the pivot axis 20. A preloaded torsion spring 156 is coupled between one of the frame side members 110 and the pawl member 152 as shown in FIG. 3 and functions to bias the pawl member 152 for rotation in the counter-clockwise direction as viewed in FIG. 4. A user-graspable handle 158 is coupled, by means of welding or similar technique, to the opposite end of the pawl member 152 and includes a lower end having an outwardly turned extension 160 positioned to engage the horizontal edge 112 of the adjacent frame side member 108 and thereby limit the counterclockwise rotational movement of the pawl member 152.

The handle 158 is positioned so that when the lower end 160 of the handle contacts the horizontal edge 112 of the frame side member 108 as illustrated in FIG. 5, the offset portion 154 of the pawl 152 extends into the path of the teeth 144 to prevent further rotation of the oven chamber 12, under its own weight, in the clockwise direction as viewed in FIG. 5. When it is desired to change the rotational position of the oven chamber 12 around the pivot axis 20, the outer end of the handle, which includes a protective plastic or rubber coating 162, can be manually depressed to rotate the pawl 152 against the bias of the torsion spring 156 and thereby rotate the pawl 152 out of the path of the teeth 144.

It will be appreciated that, because of the angled rearward faces 148 of the teeth 144, the oven chamber 12 can be manually rotated in the counter-clockwise direction as viewed in FIG. 5 without manually releasing the pawl 152. When so rotated, the teeth 144 automatically rotate the pawl 152 against the bias of the torsion spring 156 and thereby permit the oven chamber 12 to rotate in the counter-clockwise direction.

To help avoid spilling or otherwise upsetting foodstuffs placed within the oven for cooking, a self leveling tray 164 is provided within the interior cooking chamber 14. The tray 164 comprises a generally U-shaped metal bracket having a horizontal shelf portion 166 and a pair of upwardly extending tapered side portions 168 and 170 at each end. The side portions 168 and 170, in turn, are pivotally mounted to the interior side walls of the inner housing 70 by means of a pair of pivot pins 172 and 174 which define a pivot axis 176 extending substantially parallel to the pivot axis 20 of the oven chamber 12. The tray 164 is dimensioned so as to fit within the interior cooking chamber 14 and to swing freely around the pivot axis 176 established by the pivot pins 172 and 174. Accordingly, the tray 164 will pivot under its own weight so as to maintain the shelf 166 in a horizontal position regardless of the rotational position of the oven chamber 12 around the oven chamber pivot axis 20, and foodstuffs or cooking utensils placed on the shelf 166 will remain upright.

When the solar oven 10 is to be stored or transported from one site to another, the reflector assembly 30 is first removed, by displacing the reflective panels 32 and 36 away from the retaining pins 62 and 64, and then collapsed to the closed position shown in FIG. 6. Thereafter, the oven chamber 12 is positioned so that the bezel 86 is substantially co-planar with the plane defined by the forward upper edges 118 of the side members 108 and 110. Once it is so positioned, the oven chamber 12 is releasably locked against further rotation around the oven chamber pivot axis 20 by means of a pair of retaining pins 178 dimensioned to extend through apertures 180 formed in the forward upper edges 118 of the side members 108 and 110 and into respective apertures 182 formed in the sides of the bezel 86. When locked in this manner, the oven 10 can be conveniently carried from one place to another by grasping the front cross piece 122 which also functions as a carrying handle. To improve comfort, a cushioned rubber or plastic grip 184 is preferably disposed around the middle portion of the cross piece 122. Following transport, the oven chamber 12 is freed for movement around the oven chamber pivot axis 20 by removing each of the retaining pins 178.

An alternative embodiment of the oven chamber is illustrated in FIG. 8. This alternative embodiment can be identical to the embodiment illustrated in FIGS. 1 through 7 with the exception that the cross-sectional shape of the oven chamber 12 is trapezoidal rather than rectangular. The trapezoidal shape provides increased surface area for a given oven volume and is thereby capable of providing improved heating efficiency. Aside from its different cross-sectional shape, the construction of the alternative embodiment can be otherwise identical to the construction of the embodiment illustrated in FIGS. 1 through 7.

The solar oven described herein can be easily and quickly set up for use by unfolding and mounting the reflector assembly 30 and by orienting the frame assembly 18 and latch mechanism 22 so as to utilize the sun's rays to best advantage. After use, the reflector assembly 30 can be easily removed and collapsed, after which the oven 10 can be locked in the transport position and thereafter moved or stored. In addition to these advantages, the shape of the interior cooking chamber 14 avoids sharp corners which can trap foreign matter and make cleaning difficult. Finally, the self leveling tray 164 permits foodstuffs and cooking utensils to remain upright regardless of the position of the oven chamber 12. This, in turn, furthers the capability of positioning the oven chamber 12 so as to utilize best the sun's rays.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

We claim:

1. A solar oven comprising:
   an oven chamber having an open end and defining an interior cooking chamber;
   means providing a flat-black interior surface on the cooking chamber for absorbing sunlight and converting the absorbed sunlight into heat;
   an oven door hingedly mounted over said open end and movable between open and closed positions relative to said open end;
   means for pivotably supporting said oven chamber about a first substantially horizontal pivot axis;
   user-actuable latch means for selectively retaining said oven chamber in selected positions around said first horizontal axis, said user-actuable latch means including a user releasable ratchet mechanism including a plurality of ratchet teeth formed on said oven chamber and ratchet pawl pivoted to said support means in a position to engage selective ones of said ratchet teeth to retain said over chamber in selected orientations around said horizontal axis, said latch means further including means for pivoting said pawl into and out of the path of movement of said ratchet teeth to thereby achieve said selective positioning;
   a tray disposed within said interior cooking chamber for supporting foodstuffs during coking;
   pivot means for pivotally mounting said tray within said interior cooking chamber for movement around a second substantially horizontal pivot axis such that said tray can be positioned so as to maintain the foodstuffs in a substantially level position independently of the position of said oven chamer around said first pivot axis;
   a plurality of substantially planar reflective panels;
   hinge means for pivotally joining adjacent ones of said reflective panels and operable to permit movement of said reflective panels from a collapsed position, wherein said reflective panels are substantially parallel to one another, to an open position, wherein said reflective panels form a loop-like structure dimensioned to extend substantially around said open end of said oven chamber;
   each one of an opposed pair of said reflector panels being split into two substantially identical halves along a line extending through substantially the center of a respective one of said pair of reflective panels, and wherein said halves are hingedly joined along said line so that each of said opposed reflective panels folds along said line when said reflector assembly is moved from said open to said closed position; and
   means for detachably securing said reflective panels to said oven chamber around said open end when said reflective panels are in said open position.

2. A solar oven in accordance with claim 1 wherein said second pivot axis is substantially parallel to said first pivot axis.

3. A solar oven in accordance with claim 2 wherein said oven chamber is of substantially rectangular cross-section.

4. A solar oven in accordance with claim 2 wherein said oven chamber is of substantially trapezoidal cross-section.

5. A reflector assembly in accordance with claim 1 wherein said loop-like structure is substantially similarly shaped reflector panels when in said open position.

6. A reflector assembly in accordance with claim 1 wherein said means for detachably securing said reflective panels to said oven chamber includes an aperture formed in one of said reflective panels positioned to receive a projecting pin extending outwardly from the oven adjacent the opening.

7. A solar oven comprising:
   an oven chamber having an open end and defining an interior cooling chamber;
   support means for pivotally supporting said oven chamber around a first substantially horizontal pivot axis;
   a tray disposed within said interior cooking chamber for supporting foodstuffs during cooking, pivot means for pivotally mounting said tray within said interior cooking chamber for movement around a second substantially horizontal pivot axis such that said tray can be positioned so as to maintain the foodstuffs in a substantially level position independently of the position of said oven chamber around said first pivot axis;

user-actuable latch means for selectively retaining said oven chamber in selected positions around said first horizontal axis;

said user-actuale latch means including a user releasable ratchet mechanism having a plurality of ratchet teeth formed on said oven chamber and a ratchet pawl mounted to said support means and positioned to selectively retain individual ones of said ratchet teeth to selectively retain said oven chamber in selected orientations around said first horizontal axis, said latch means further including means for pivoting said pawl into and out of the path of movement of said ratchet teeth to thereby achieve said selective positioning;

a plurality of substantially planar reflective panels;

hinge means for hingedly joining adjacent ones of said reflective panels and operable to permit movement of said reflective panels from a collapsed position, wherein said reflective panels are substantially parallel to one another, to an open position, wherein said reflective panels form a loop-like structure dimensioned to extend substantially around the opening of the oven; and means for detachably securing said loop-like structure to said oven chamber around said opening; and each one of an opposed pair of said reflector panels being split into two substantially identical halves along a line extending through substantially the center of a respective one of said pair of reflective panels, and wherein said halves are hingedly joined along said line so that each of said opposed reflective panels folds along said line when said reflector assembly is moved from said open to said closed position.

8. A solar oven in accordance with claim 7 wherein said second horizontal axis is substantially parallel to said first pivot axis.

9. A solar oven in accordance with claim 7 wherein said user-actuable latch means further comprises a bias spring for biasing said ratchet pawl into the path of said ratchet teeth, and a user graphic handle coupled to said ratchet pawl for rotating said ratchet awl out of the path of said ratchet teeth against the force of said bias spring.

10. A solar oven in accordance with claim 7 wherein said oven chamber is of substantially rectangular cross-section.

11. A solar oven in accordance with claim wherein said oven chamber is of substantially trapezoidal cross-section.

* * * * *

UNITED STATES PATENT AND TRADEMARK OFFICE
CERTIFICATE OF CORRECTION

PATENT NO. : 4,848,320

DATED : July 18, 1989

INVENTOR(S) : Thomas J. Burns and Cynthia L. Burns

It is certified that error appears in the above-identified patent and that said Letters Patent is hereby corrected as shown below:

Column 8, Claim 5, line 52, after "substantially" insert --rectangular in form and includes four substantially--.

Column 9, Claim 7, line 15, "retain" should be --engage--.

Column 10, Claim 9, line 19, "graphic" should be --graspable--;

Claim 9, line 20, "awl" should be --pawl--; and

Claim 11, line 25, after "claim" insert --7--.

Signed and Sealed this

Twenty-second Day of May, 1990

Attest:

HARRY F. MANBECK, JR.

*Attesting Officer*     *Commissioner of Patents and Trademarks*